Feb. 4, 1936.    R. J. ROSHIRT ET AL    2,029,673
PERMANENT MOLDING APPARATUS
Filed Aug. 15, 1932    6 Sheets-Sheet 1

Inventors
Randolph J. Roshirt
Arthur T. Bateman
Andrew Irvine

By Williamson, Hulbert, Williamson & Belknap
Attorneys

Inventors
Randolph J. Roshirt
Arthur V. Bateman
Andrew Irvine

Feb. 4, 1936.    R. J. ROSHIRT ET AL    2,029,673
PERMANENT MOLDING APPARATUS
Filed Aug. 15, 1932    6 Sheets-Sheet 6

Patented Feb. 4, 1936

2,029,673

UNITED STATES PATENT OFFICE 2,029,673

PERMANENT MOLDING APPARATUS

Randolph J. Roshirt, Arthur T. Bateman, and Andrew Irvine, Detroit, Mich., assignors to Bohn Aluminum and Brass Corporation, Detroit, Mich., a corporation of Michigan Application August 15, 1932, Serial No. 628,946

10 Claims. (Cl. 22—136)

This invention relates generally to molding equipment and refers more particularly to permanent molding apparatus.

While the inventive principles of the molding apparatus forming the subject matter of this invention may be advantageously employed in connection with different types of molding equipment for forming castings of various shapes, nevertheless, these principles render it practical to fashion an internal combustion engine cylinder head casting from a permanent mold, and, accordingly, find particular utility when employed for this purpose.

The desirability of permanent molding apparatus for production use over the ordinary sand mold process is well recognized in that the former not only simplifies, renders more efficient and reduces the cost of molding, but provides for obtaining a more accurate casting. Furthermore, it has been found that the formation of a casting from a permanent mold materially increases the density of the casting which is especially advantageous when the latter is formed from aluminum or some metal having similar characteristics. Notwithstanding the foregoing indisputable advantages of permanent molding, a large number of manufacturers still resort to sand molds for the commercial production of internal combustion engine cylinder head castings. The unpopularity of permanent molding apparatus in the production of cylinder head castings is attributed to the complicated nature of the latter and to the difficulty heretofore encountered in designing a commercially satisfactory apparatus capable of forming castings accurately and expediently.

The present invention contemplates the provision of permanent molding apparatus composed of a few simple parts movable relative to each other in accordance with a predetermined sequence and having portions cooperating with each other in one relative position thereof to form a permanent mold cavity conforming exactly in contour to the shape of the casting. Movement of the aforesaid parts to their various positions of adjustment is accomplished automatically in timed relation to each other, and the use of sand in any form is obviated with the result that the formation of the mold is materially expedited.

A further object of this invention which contributes materially to the commercial acceptability of the castings formed thereby is attributed to the cooperation of a number of features of the apparatus to form a casting free from porosity and within limits heretofore considered impossible. In forming cylinder head castings in production, accuracy in molding is extremely desirable since variations in the dimensions of the combustion chambers produces corresponding variations in the volumetric efficiency of the cylinders, and, accordingly, detrimentally affects engine performance.

One of the features of the present invention consists in the provision of permanent molding apparatus fashioned to minimize obstructions in the mold cavity tending to interrupt the flow of metal and produce agitation which is responsible to a large extent for blowholes in the casting. Elimination of blowholes in a cylinder head casting is especially desirable owing to the high pressures obtained and the necessity for certain types of heads to retain a cooling medium.

Another feature of the permanent molding apparatus forming the subject matter of this invention is attributed to the novel means provided for maintaining the metal in the feeding portions or risers of the mold at a sufficiently high temperature to insure a satisfactory flow of the metal into the mold cavity. By reason of the foregoing, the volumetric capacity of the risers may be reduced to the minimum without affecting the supply of metal to the mold with the result that a material saving in metal is realized.

While the foregoing features are advantageous irrespective of the metal employed in forming the mold, nevertheless, they are especially desirable when the castings are fashioned from aluminum or some metal having similar characteristics due to the fact that these metals usually have a comparatively low pouring temperature and for this reason freeze or solidify at a relatively high rate. Consequently, in forming castings from metals of the above type, it is especially important that the metal be maintained at the desirable temperature and that the flow of metal in the mold cavities be continuous and uninterrupted. Inasmuch as the permanent molding apparatus illustrated herein provides for obtaining the foregoing results as previously stated, it will be apparent that the same is particularly applicable to forming cylinder head castings from metals having high thermal conductivity such as aluminum.

A further advantageous feature of the present invention resides in the novel gating means employed in the permanent mold which, together with the above features, insures the provision of an efficient casting.

The permanent molding apparatus forming the subject matter of this invention possesses numerous other structural features which are extremely important in expediently molding commercially satisfactory castings. These features will be more fully hereinafter set forth as this description proceeds, especially when considered in connection with the accompanying drawings, wherein:

Owing to the extremely satisfactory results obtained in molding internal combustion engine cylinder heads from aluminum by our improved permanent molding apparatus, we have shown the latter herein for the purpose of illustration as employed in the manufacture of aluminum cylinder head castings.

The molding apparatus to be presently described may be more clearly understood by first referring to the particular construction of cylinder head adapted to be cast by the apparatus. As shown in Figures 1 to 4, inclusive, the cylinder head is preferably of the water cooled type and comprises two separable sections 20 and 21 arranged in superposed relationship in the assembled position of the head. The lower section 21 of the head is formed with a plurality of combustion chambers 22 in the lower face thereof, and in the present instance, is preferably fashioned from a metal having a high thermal conductivity such as aluminum or an aluminum alloy. The section 21 is open at the upper side thereof and is provided with upwardly extending side walls 23 integrally connected with the stud bosses 24 which are apertured as at 25 for the passage of suitable studs 26. The top wall portions of the combustion chambers 22 as well as the entire section 21 is reinforced by ribs 27 integrally connecting the aforesaid wall portions to the side walls 23 of the section 21. The latter, in addition to having the openings 25 through the bosses 24 for the studs, is further provided with openings 28 therethrough arranged to permit the circulation of a cooling medium through the head.

Figures 1, 2:
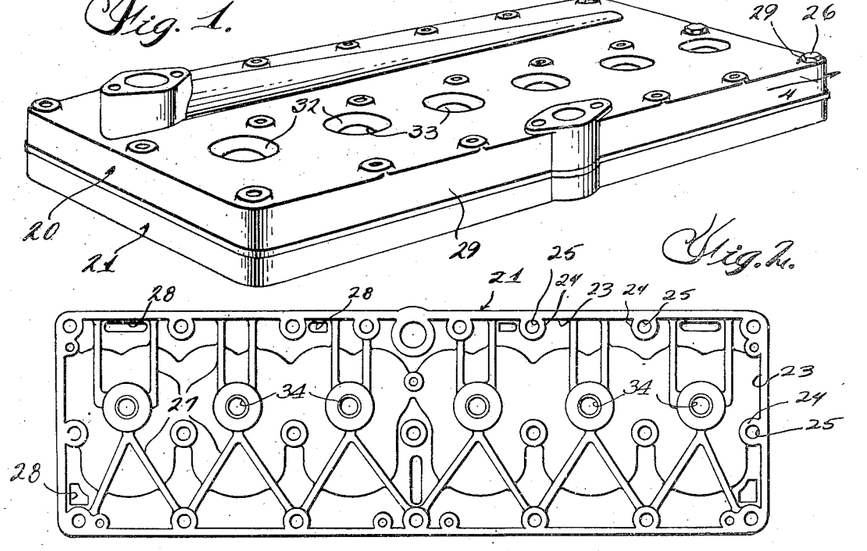
Figure 1 is a perspective view of a composite cylinder head embodying a lower section fashioned from the apparatus illustrated herein.
Figure 2 is a plan view of the lower section aforesaid of the head.
Figure 3:
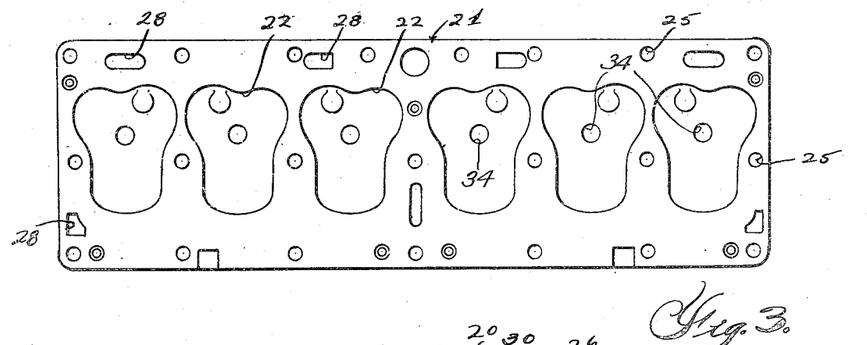
Figure 3 is a bottom plan view of the section shown in Figure 2.
Figure 4:
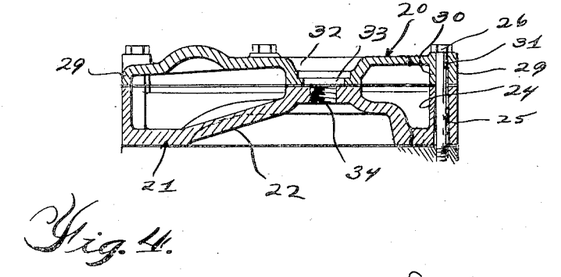
Figure 4 is a transverse sectional view taken substantially on the line 4—4 of Figure 1.

The upper section 20 serves to close the open side aforesaid of the section 21 and is preferably formed of cast iron or some material having a relatively high tensile strength so as to reinforce the aluminum section 21 when clamped thereto by means of the studs 26. In detail, the section 20 is provided with marginal side walls 29 extending downwardly from the top thereof and fashioned to seat or abut the upper edges of the side walls 23 on the lower section 21. The top wall of the upper section 20 is also provided with stud bosses 30 extending downwardly therefrom for seating engagement with the stud bosses 24 on the lower section and having openings 31 therethrough registering with the openings 25 to permit free passage of the studs through both sections. The upper section 20 is also provided with a plurality of depressions 32 corresponding in number to the number of combustion chambers and having openings 33 therethrough in registration with openings 34 in the top walls of the combustion chambers to accommodate the usual spark plugs. The bottom surfaces of the depressions 32 are fashioned for seating engagement with the portions of the top walls of the combustion chambers surrounding the spark plug openings 34 therethrough so that when the section 21 is clamped between the section 20 and the cylinder block (not shown), the aforesaid depressions will serve as an effective reinforcement for the combustion chambers.

The section 20, in addition to forming a structural reinforcement for the section 21, also cooperates therewith to form a water space above the combustion chambers, and permits eliminating the complicated water jackets usually employed in a cylinder head of the one-piece type. The elimination of the conventional type of water jacket is an important feature since it materially simplifies the manufacture of both sections from a permanent mold. It will further be observed that the above cylinder head provides for obtaining all of the recognized advantages resulting from the formation of the combustion chambers of a metal of relatively high thermal conductivity and at the same time possesses the necessary rigidity.

While it has been stated that both sections of the composite head previously described may be formed from a permanent mold, nevertheless, the apparatus specifically shown herein is particularly designed for the purpose of molding the lower cylinder head casting 21. We have illustrated the invention in this manner not only because the permanent molding apparatus shown herein is particularly applicable to forming aluminum castings, but also because it is capable of forming a casting to accurate predetermined limits which is desirable in manufacturing the cylinder head casting 21. With our permanent molding apparatus about to be described, the combustion chambers are all of accurate predetermined size with the result that the volumetric efficiency of the chambers is uniform and the performance of the engine thereby materially increased.

Figure 6:
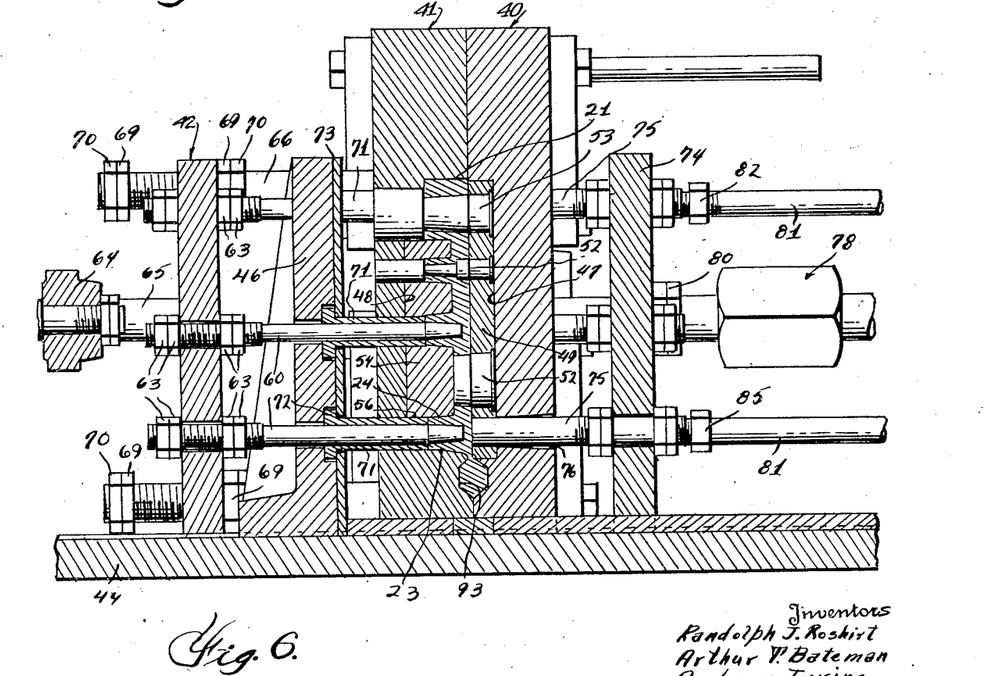
Figure 6 is a fragmentary cross sectional view through the several mold parts taken substantially on the line 6—6 of Figure 5.
Figure 7:
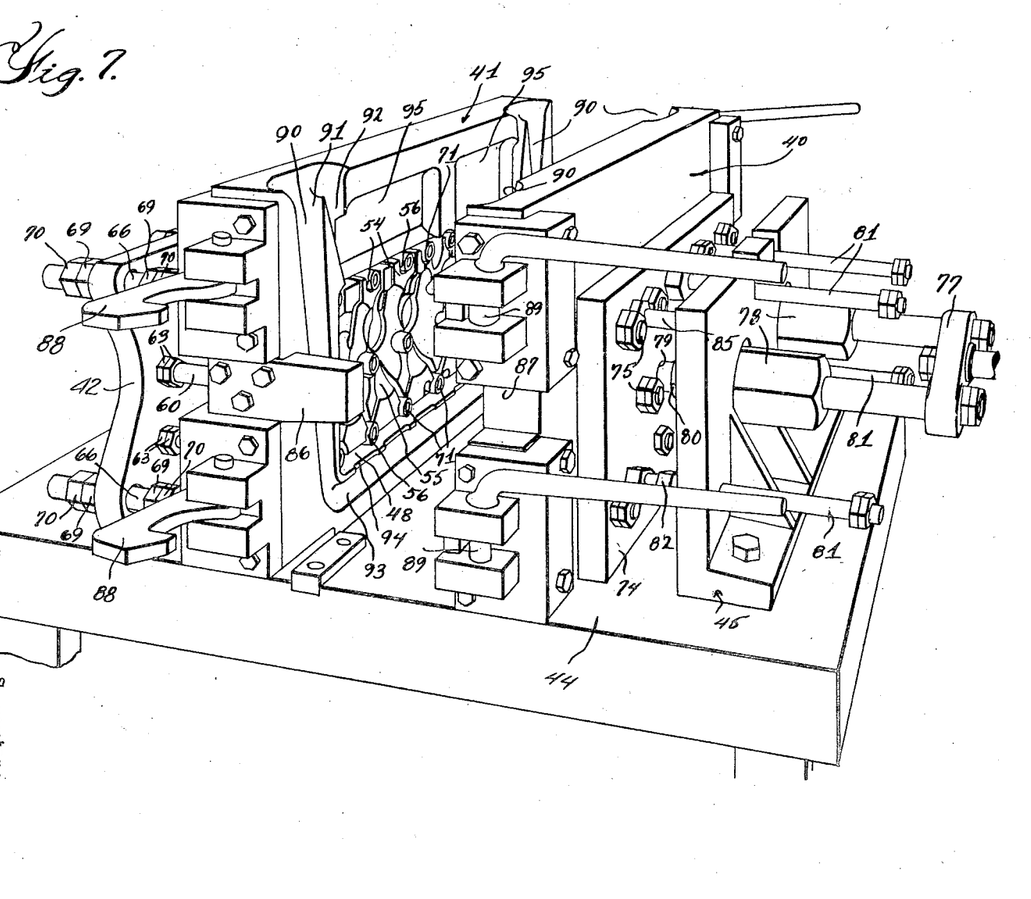
Figure 7 is a perspective view of the molding apparatus showing the several parts thereof in positions wherein the mold is opened.
Figure 8:
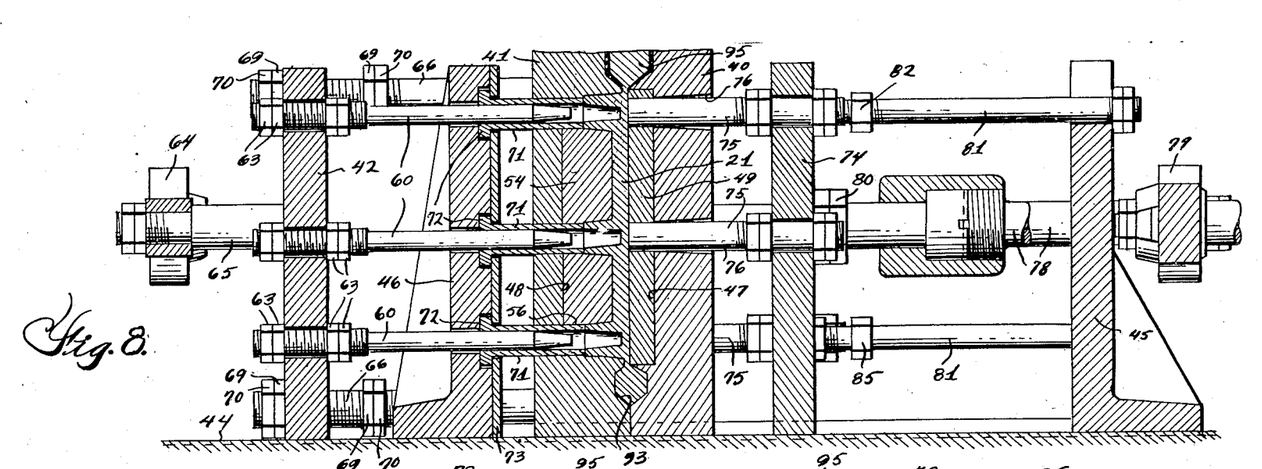
Figure 8 is a cross sectional view through the several parts of the molding apparatus showing the latter in another position of adjustment and taken substantially on the line 8—8 of Figure 5.
Figure 9:
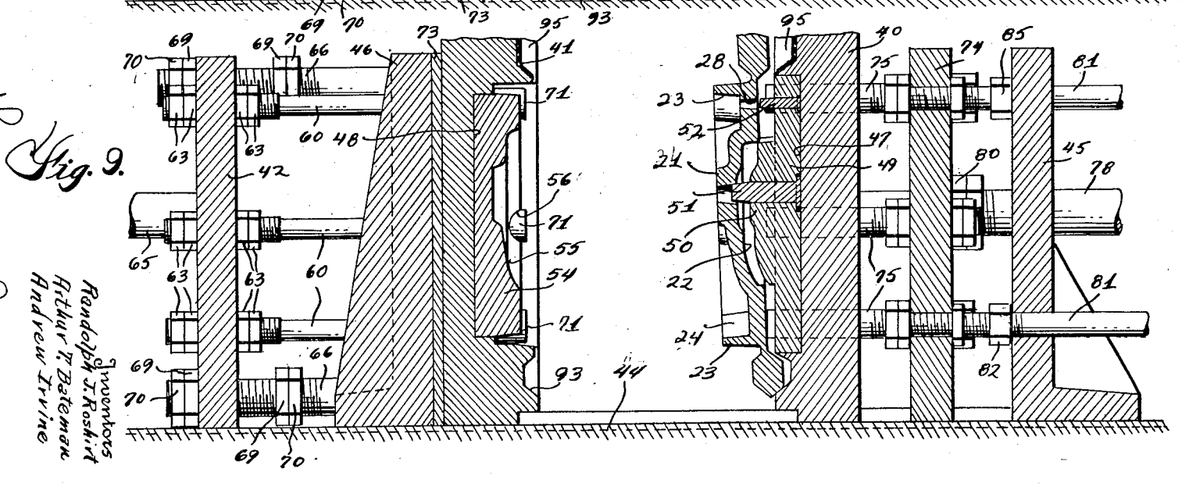
Figure 9 is a fragmentary cross sectional view illustrating the manner in which the casting is ejected from one of the permanent mold sections and taken substantially on the line 9—9 of Figure 5.
Figure 10:
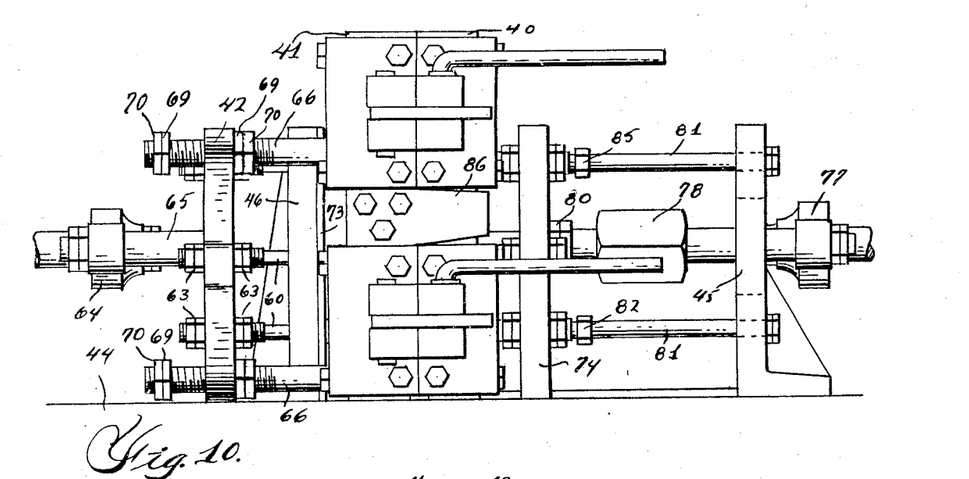
Figure 10 is a side elevational view of the molding apparatus.

The permanent molding apparatus for forming the casting 21 comprises in general three relatively movable sections cooperating with each other in the relative positions thereof shown in Figure 6 to form a mold cavity corresponding in contour to the shape of the casting 21. The three sections referred to above are designated herein by the reference characters 40, 41 and 42 and are operatively connected for actuation in accordance with a predetermined sequence. Assuming that the sections are in positions wherein the mold is open as shown in Figure 7 and that it is desired to close the mold, the section 42 is moved relative to the remaining sections in a direction toward the section 41 to extend the permanent core members carried thereby in operative relationship to the section 41. Both the section 42 and the section 41 are then caused to move as a unit toward the section 40 and power is applied to the latter for moving the same in a direction toward the aforesaid sections in cooperative relationship thereto. Upon completion of the foregoing operation, a mold cavity is formed by the sections which corresponds exactly in contour to the shape of the casting 21.

Assuming now that it is desired to open the mold, the section 42 is moved relative to the other sections in a direction away from the section 41 in order to withdraw the permanet cores carried thereby from the casting while the latter is supported between the sections 40 and 41. As soon as the core members are withdrawn from the casting, the section 41 is caused to move as a unit with the section 42 in a corresponding direction away from the section 40. As will be more fully hereinafter set forth, the casting is clamped at a plurality of spaced points to the section 40 during relative movement of the section 41 away from the former section with the result that the casting will be effectively stripped from the latter section and deformation thereof prevented. The section 40 is then moved in a direction away from the section 41 and during this movement, the casting is ejected therefrom by suitable means which will also be made more apparent as this description proceeds.

Referring now more in detail to the permanent molding apparatus briefly outlined above, it will be noted that the same comprises a table 44 having upright members 45 and 46 fixed to the top surface thereof in spaced relation to each other. Slidably supported by the table 44 between the uprights are the sections 40 and 41. Both of the aforesaid sections are formed with recesses 47 and 48 in the adjacent vertical faces thereof adapted to register with each other in the innermost or closed positions of the sections. Secured within both the recesses 47 and 48 are suitable inserts which are accurately formed to cooperate with each other in the closed positions of the mold sections to form with the mold parts carried by the section 42 a mold cavity corresponding exactly to the shape of the cylinder head casting 21.

In detail, the recess 47 in the permanent mold section 40 is fashioned to receive a plurality of inserts 49 having core portions 50 formed integral therewith and fashioned to project beyond the inner vertical face of the mold section 40. The core portions 50 are accurately machined to correspond to the combustion chambers 22 in the casting 21 and in the present instance, two core members are formed on each insert 49. The spark plug openings 34 through the upper wall of the combustion chamber 22 in the cylinder head casting 21 are formed by permanent core members 51 sleeved within openings in the inserts 49 and having the outer ends projecting beyond the permanent core 50 a sufficient distance to form the aforesaid openings 34. Although the permanent cores 51 may be formed integral with the inserts if desired, nevertheless, we prefer the construction shown herein since it provides for more satisfactorily venting the mold. In other words, the clearance between the side walls of the core members 50 and openings in the inserts through which the same extend permits the gas occulted in the metal to escape with the result that porosity is minimized.

Figure 12:
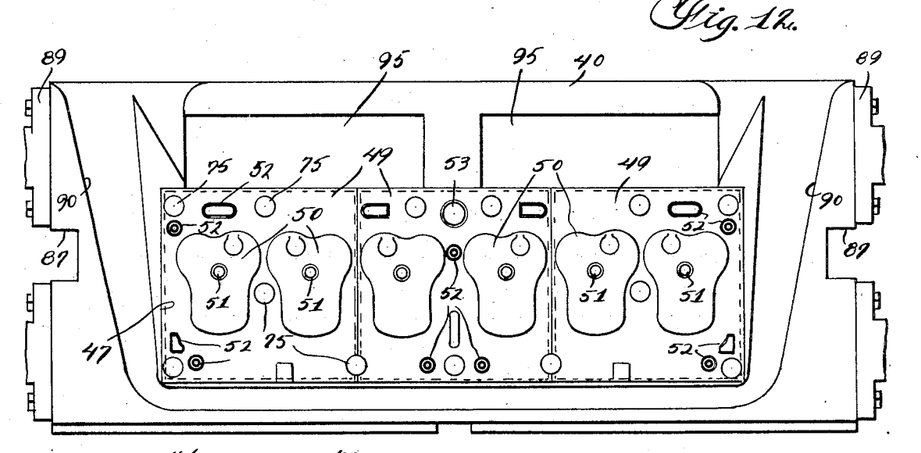
Figure 12 is an inner side elevational view of a cooperating permanent mold section.

In addition to the above core members, the inserts 49 are provided with permanent core members 52 having portions extending outwardly beyond the vertical face of the mold section 40 a sufficient distance to form the openings provided in the casting 21 for the passage of water or other cooling medium. The core members 52 vary in shape as will be observed from Figure 12 and are assembled with the inserts in the same manner as the permanent cores 51 so as to facilitate venting of the mold. In the event the casting is provided with an opening therethrough for the passage of the distributor or accessory shaft of the engine, one of the inserts 49 may be provided with an additional permanent core 53 secured to the insert in the same manner as the cores 51 and having a portion projecting beyond the inner face of the mold section 40 a sufficient distance to form the desired opening.

The recess 48 in the permanent mold section 41 is fashioned to receive a plurality of inserts 54 corresponding in number to the number of inserts 49 and having recesses 55 in the outer faces thereof registrable with the permanent cores 50 on the inserts 49 to form therewith a mold cavity corresponding exactly to the walls of the combustion chambers 22 in the casting 21. The inserts 54 also cooperate with the other of the core members on the inserts 49 to form the desired cavity in the casting 21, and in addition are provided with openings 56 therethrough for the passage of the mold parts carried by the section 42 into the mold cavity. It will be observed from the foregoing that the casting is formed in the permanent mold section 41 and the section 40 merely carries a number of the cores for imparting the desired contours to the casting.

While it will be understood from the previous description that the cooperating inserts may be formed integral with the adjacent vertical faces of the mold sections 40 and 41, nevertheless, several distinct advantages are secured by forming the same of a plurality of members separate from the mold sections 40 and 41. By resorting to the present construction, the gas occulted in the molten metal is not only permitted to escape through the joints between the inserts and permanent mold sections, but the inserts may be replaced without the necessity of discarding the mold sections 40 and 41 of the apparatus. Furthermore, the present arrangement provides for adjusting the inserts relative to each other so as to compensate for any slight variations in the construction. In other words, suitable shims may be interposed between adjacent walls of the inserts and mold sections so that by properly selecting the shims, the dimensions of the mold cavities formed by the inserts may be accurately controlled.

As indicated above, the mold section 42 is also slidably mounted upon the table 44 and carries a plurality of mold parts adapted to cooperate with the sections 40 and 41 in the position thereof shown in Figure 6 to form a mold cavity conforming in contour to the shape of the casting. The mold parts carried by the section 42 are in the form of core pins 60 extending from the section 42 toward the permanent mold section 41 and projecting through aligned openings in the upright member 46 and mold section 41. The openings in the mold section 41 are arranged in registration with the openings 56 in the inserts 54 so as to permit the extremities of the core pins to be extended into the mold cavity. The core pins 60 correspond in number and spacing to the number and spacing of the stud bosses 24 on the casting 21, and the extremities thereof cooperate with the adjacent portions of the inserts 54 to form the bosses 24 and the recesses 25 therein. The opposite extremities of the core pins extend through openings formed in the section 42 and are threaded for receiving the clamping nuts 63. A pair of the nuts 63 is threaded upon each core pin for clamping engagement with opposite sides of the section 42 in order to adjustably secure the pins thereto.

The core pins 60 are moved as a unit into and out of the mold cavity by means of a reciprocable head 64 connected intermediate the ends thereof to a suitable source of power (not shown) and having the ends secured to the section 42 by the fastener elements designated generally herein by the reference character 65. The section 42, on the other hand, is connected to the permanent mold section 41 by means of the studs 66 having the inner ends threadedly engaging the mold section 41 as at 67 and having the outer ends extending through enlarged openings 68 formed in the opposite ends of the section 42. Threaded on the outer end portions of each of the studs on opposite sides of the section 42 is a pair of adjustable nuts 69 forming axially spaced abutments and normally held in accurate spaced relationship by means of lock nuts 70. In general, the arrangement is such as to provide for actuation of the mold section 41 from the reciprocable head 64 in timed relation to the operation of the latter to move the section 42. In detail, when the permanent mold sections are in their separated positions, or, in other words, when the mold is opened, the section 42 is in engagement with the outermost abutments 69 so that upon initially closing the mold, the section 42 moves the core pins 60 relative to and toward the mold section 41 a distance corresponding to the axial space between the abutments 69. The axial distance between the abutments 69 may be readily varied due to the threaded engagement of the abutments with the studs, and is so determined as to limit the extension of the core pins into the mold cavity. The core pins are shown in their extreme innermost positions in Figure 6, and as will be observed, terminate short of the adjacent wall of the mold cavity, or, in other words, are prevented from extending through the casting. In other words, the stud bosses are merely partially cored by the pins 60, and as will be presently shown, this feature is a decidedly important one.

By merely partially coring the stud bosses in the manner set forth above, the mold or casting is of substantially constant cross sectional area, with the result that localized shrinkage is eliminated. In other words, the usual cavity at the upper ends or the stud bosses caused by the shrinkage of metal in the latter when completely coring the same is obviated and a more efficient casting results. Furthermore, with the present arrangement, less obstruction is offered to the flow of metal into the mold cavity, with the result that the tendency of the metal to agitate and produce blowholes in the casting is minimized.

As hereinbefore stated, means is provided upon opening the mold to strip the casting from the section 41 and to clamp the casting to the section 40. The foregoing is accomplished herein by providing bushings 71 on the core pins. In detail, the bushings 71 are anchored within the stationary upright 46 and extend inwardly therefrom into the openings formed in the permanent mold section 41 through which the core pins project. The lengths of the bushings are so determined that when the permanent mold sections are in their relative positions shown in Figure 6, the inner ends of the bushings cooperate to form the portions of the casting encircling the openings through the stud bosses. The outer ends of the bushings 71 are flanged as at 72, or, in other words, are provided with enlarged head portions adapted to extend within counterbored recesses formed in the inner face of the upright 46 and are secured therein by means of a removable plate 73 fixed to the aforesaid face of the upright. It will be observed from Figure 6 that the bushings are loosely secured in place so as to compensate for the differences in expansion of the stationary upright 46 and mold section 41. The bushings 71 being stationary with respect to the movable permanent mold section 41, it will be noted that the latter may be moved in a direction away from the section 40 without effecting movement of the casting therebetween. In other words, the bushings serve to clamp the casting to the section 40 during movement of the section 41 in a direction away from the section 40 and thereby obviate any tendency for the casting to distort during opening the mold.

In view of the fact that the casting is clamped to the permanent mold section 40 upon opening the mold, we have provided means for ejecting the casting from this section. The means for accomplishing this result in the present instance comprises a member 74 similar in general construction to the section 42 of the permanent mold in that it is slidably mounted upon the support and carries a plurality of pins 75 which project inwardly therefrom through aligned openings 76 formed in the section 40 and inserts carried thereby. The pins 75 are adjustably secured to the member 74 and are of such length that when the same are in their inoperative positions, the outer ends thereof lie flush with the inner vertical face of the permanent mold section 40.

Figure 5:
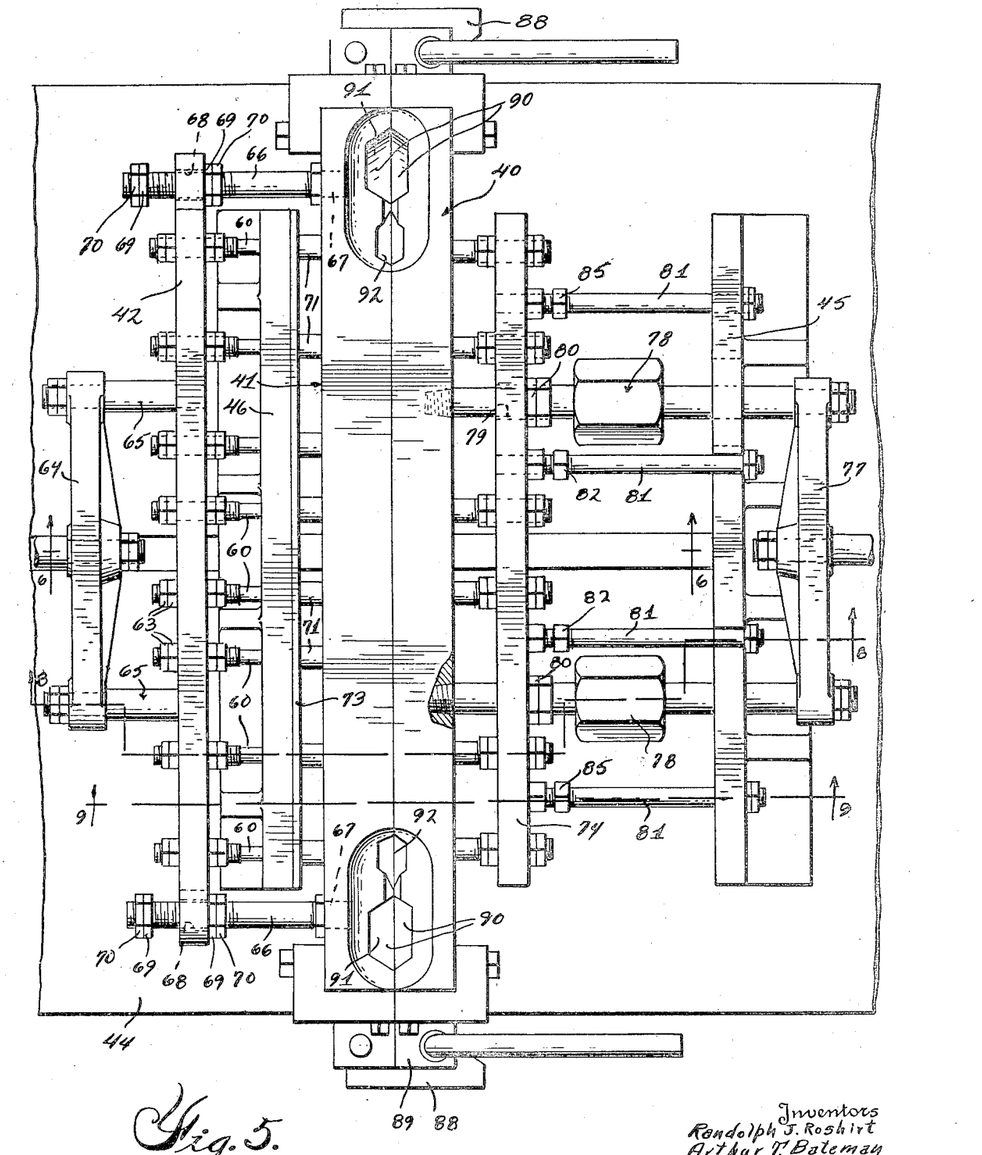
Figure 5 is a plan view of the molding apparatus constructed in accordance with this invention and showing the several relatively movable parts in positions wherein the mold is closed.

The ejector carrying plate or member 74 is actuated by a reciprocable head 77 through the medium of the permanent mold section 40. In detail, the head 77 is connected intermediate its ends to a suitable source of power (not shown) and the opposite ends thereof are directly coupled to the permanent mold section 40 through the medium of suitable connections 78 in such a manner that the latter permanent mold section moves as a unit with the reciprocable head 77. The ejector carrying plate 74 is provided with openings 79 for the passage of the connections 78 therethrough, and the latter are equipped with adjustable abutments 80 fashioned to engage the outer face of the plate 74. The abutments 80 are for the purpose of moving the permanent mold section 40 and the ejector pin carrying plate 74 as a unit in a direction to close the mold, and in addition serve to position the inner ends of the ejector pins 75 flush with the inner vertical face of the permanent mold section 40 when the mold is closed. The plate 74 is further provided with a pair of outwardly extending rods 81 having the outer end portions slidably engaging openings formed in the stationary upright 45 and having an abutment 82 adjustably secured thereto in a position to engage the inner face of the upright for arresting movement of the plate 74 prior to complete retraction of the permanent mold section 40. In detail, movement of the permanent mold section 40 in a direction away from its cooperating section 41 will effect a corresponding movement of the plate 74 owing to the fact that the inner ends of the ejector pins are in engagement with the casting. The section 40 and plate 74 are retracted as a unit until the abutments 82 engage the fixed upright 45 whereupon continued retraction of the section 40 causes the ejector pins 75 to project beyond the inner vertical face of the section 40, and in so doing ejects the casting from this latter section. As will be observed from Figure 5, the abutments 82 may be assisted in their action by means of additional abutments 85 in the form of stud bolts having threaded shanks anchored within the plate 74.

*Operation*

Assuming that the several relatively movable parts of the molding apparatus described above are in the positions thereof shown in Figure 7 and that it is desired to form a casting, power is applied to the head 64 to move the same in an inward direction. Owing to the direct connection between the head 64 and core pin carrying section 42, the latter is moved as a unit with the head 64 in a corresponding direction. Due to the lost motion connection between the section 42 and permanent mold section 41, the section 42 is moved relative to the permanent mold section 41 until the former strikes the innermost abutments 69 at which time the core pins are in their proper relationship with respect to the permanent mold section 41. As previously stated, the abutments are carried by members fixed relative to the section 41 so that continued movement of the section 42 by the head 64 will cause a corresponding movement of the permanent mold section 41 relative to the stationary core pin bushings 71. When the above cycle of operation of the apparatus is completed, the aforesaid relatively movable parts thereof assume the positions shown in Figure 6 and require no further attention on the part of the operator.

During movement of the aforesaid sections to their operative positions shown in this latter figure, or after the same have been moved to these positions, the permanent mold section 40 is moved into cooperative relationship with the section 41. This is accomplished by applying power to the head 77 in such a manner as to move the latter inwardly, and since the same is directly connected to the permanent mold section 40, the latter will be moved as a unit therewith in a corresponding direction. Inasmuch as the aforesaid connections between the permanent mold section 40 and head 77 are provided with abutments adapted to engage the outer face of the ejector carrying plate 74 in the manner specified above, the latter will be moved with the section 40 to the positions thereof shown in Figure 6. Accurate registration of the inserts carried by the adjacent vertical faces of the two cooperating permanent mold sections is insured by means of guide members 86 fixed to opposite ends of one of the sections and adapted to register with recesses 87 formed in the corresponding ends of the cooperating mold section. After all of the relatively movable mold parts are in their assembled relationship as shown in Figure 6, the two cooperating sections 40 and 41 are clamped together by means of suitable clamps 88 pivotally mounted in pairs on opposite ends of one of the sections for engaging cooperating parts 89 on the corresponding ends of the adjacent section. After the clamps have been operated to positively secure the sections 40 and 41 together, the molten metal may be poured into the mold in the manner to be more fully hereinafter set forth.

Assuming now that the mold has been poured and that it is desired to open the same, power is applied to the head 64 causing the latter, together with the section 42, to move outwardly relative to the permanent mold section 41 until the section 42 engages the outermost abutments 69 at which time continued movement thereof effects a corresponding outward movement of the mold section 41. During the interval of movement of the section 42 relative to the section 41, or, in other words, while the casting is supported by both the sections 40 and 41, the core pins are withdrawn therefrom. After the core pins are withdrawn from the mold, continued outward movement of the section 42 causes a corresponding outward movement of the mold section 41 through the outermost abutments 69 in the manner set forth above. The aforesaid outward movement of the section 41 is effected relative to the stationary bushings 71 surrounding each of the core pins and engaging the casting with the result that deformation of the casting is prevented since each of the bushings serves to maintain the casting in supporting relationship to the permanent mold section 40.

Upon completion of the foregoing operations, power is applied to the head 77 causing the latter to move outwardly and effecting a corresponding movement of the mold section 40 through the medium of the connections 78 between the mold section 40 and head 77. While movement of the section 40 in the above direction destroys the supporting relationship between the bushings 71 and casting, nevertheless, the latter adheres to the core members or inserts upon the section 40, and, accordingly, is carried outwardly therewith. Inasmuch as the inner ends of the ejector pins are in engagement with the casting, the plate carrying the pins is moved outwardly as a unit with the section 40 until the abutments 82 engage the stationary upright 45 at which time continued outward movement of the section 40 is effected relative to the pins, with the result that the casting is ejected from this latter section. It will, of course, be apparent from the drawings that all of the permanent core members, as well as the core pins, are tapered in directions to permit readily withdrawing the same from the casting without any tendency of deforming the latter.

It will be observed from the foregoing that we have provided apparatus capable of forming a complicated casting and composed of a relatively few number of parts cooperating with each other in one position thereof to form a permanent mold cavity conforming exactly in contour to the shape of the desired casting. It will further be apparent that all of the relatively movable parts are automatically operated in timed relation to each other and while various different sequences of operation may be resorted to, nevertheless, we prefer the one set forth above since extremely satisfactory results have been secured thereby.

Figure 11:
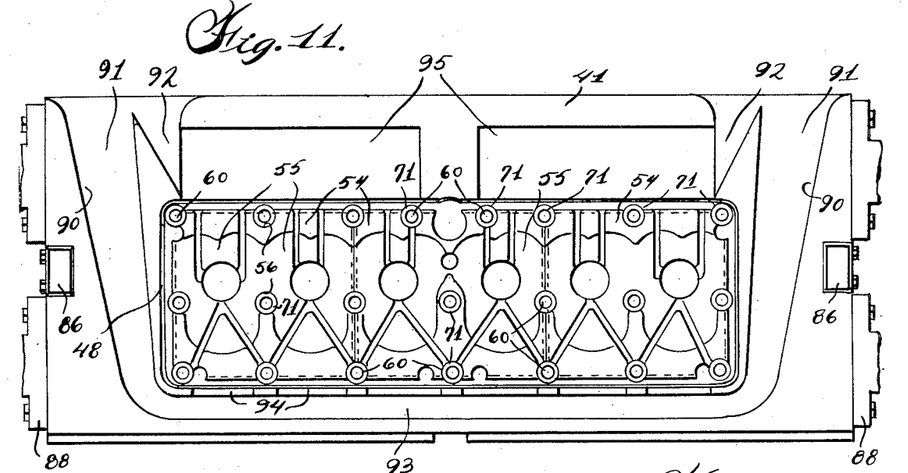
Figure 11 is an inner side elevational view of one of the permanent mold sections.

Much of the commercial value and acceptability of the foregoing permanent molding apparatus is attributed to the novel means provided for insuring a continuous even flow of the molten metal into the mold cavity. In general, the molten metal is poured into gates arranged upon opposite ends of the molding apparatus and communicating with the mold cavity at the bottom thereof. The metal flows upwardly through the mold cavity into suitable risers arranged above the cavity and communicating therewith at the upper end thereof so as to feed back into the same. In detail, both the permanent mold sections 40 and 41 are formed with registering recesses 90 in opposite ends thereof fashioned to cooperate in the closed positions of the sections to form main gates 91 and overflow gates 92. As shown particularly in Figure 11, the main gates 91 communicate at the lower ends with a distributing passage 93 extending below the mold cavity for substantially the full length thereof and communicating therewith through the lower end thereof as at 94. The arrangement is such that as the metal is poured within both the gates 91, the same is discharged into the distributing passage 93 and caused to flow upwardly through the mold cavity into the risers 95. The risers 95 are positioned above the mold cavities in communication therewith and are formed by cooperating recesses in the adjacent faces of the mold sections 40 and 41. It has been found that by supplying the mold cavity with metal in the manner specified above, agitation of the metal takes place in the distributing passage 93 before being discharged into the mold cavity. This feature, together with the fact that every precaution is taken to prevent agitation of the metal in the mold cavity by minimizing obstruction to the flow of the metal, eliminates any tendency for blowholes to form in the casting.

Figure 13:
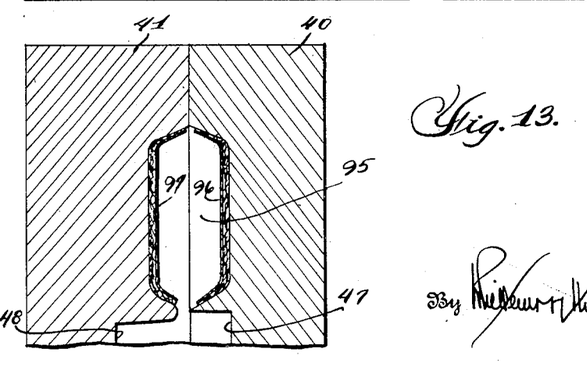
Figure 13 is an enlarged cross sectional view through a pair of cooperating permanent mold sections illustrating the riser construction.

Inasmuch as the metal in the riser above the mold cavity feeds back into the mold cavity, it is highly desirable that the metal temperature in the risers be maintained. This is accomplished herein by insulating the side walls of the risers as clearly shown in Figure 13. In detail, the risers are provided with laterally spaced side walls 96 and 97 having suitable heat insulating material interposed therebetween. The heat insulating material minimizes the escape of the heat from the metal in the riser through the mold sections, and, consequently, maintains the metal in a more liquid state, or, in other words, facilitates the flow of the metal from the risers into the mold cavity. The provision of means of the above type for maintaining the metal temperature is desirable not only because it cooperates to produce a more efficient casting, but also because it minimizes waste since it permits reducing the volume of the risers to the minimum. The risers may also be supplied with molten metal directly through the overflow gates if desired without interfering with the efficiency of the casting.

It has been found by actual practice that molding apparatus constructed in accordance with the foregoing description not only materially expedites and reduces the cost of manufacture of cylinder head castings, but in addition renders it possible to form the latter from a metal having as one of its characteristics high thermal conductivity. The formation of a cylinder head casting from metals having high thermal conductivity is important since such metals provide for dissipating the heat more rapidly, and, as a consequence, permits compression ratios to be increased without danger of detonation. While these advantages have been recognized by the trade for some time, nevertheless, the commercial production of cylinder heads embodying these features was heretofore considered impractical owing to the difficulties encountered in molding the same and the expense involved. We have provided herein apparatus which renders the commercial production of these heads practical and at a cost considerably lower than has heretofore been considered possible.

It has also been found that the combustion chambers of cylinder head castings resulting from the above described apparatus are accurate within one cubic centimeter of a predetermined desired volume which is by far more accurate than any molding equipment now commercially employed is capable of producing. Accuracy and uniformity of the combustion chambers in a cylinder head without the necessity of machining the latter are highly desirable since these characteristics insure uniform volumetric efficiency of each cylinder of the engine and provide for increasing the performance of the latter.

While in describing this invention the apparatus has been referred to as forming a particular type of cylinder head casting, nevertheless, it is to be understood that the same may be employed advantageously for forming cylinder head castings of various descriptions, and, accordingly, reservation is made to make such changes in the details of construction as may come within the purview of the accompanying claims.

What we claim as our invention is:

1. Permanent molding apparatus for forming a cylinder head casting having a plurality of combustion chambers therein, comprising sections relatively movable toward each other and cooperating in their innermost position to form a permanent mold cavity corresponding in contour to the shape of the casting, means for separating said sections subsequent to the pouring operation, means engaging one outer face of the casting to clamp the opposite face into engagement with the adjacent mold section during separation of the sections, and means other than last named means for subsequently ejecting the casting from the aforesaid section.

2. Permanent molding apparatus for forming a cylinder head casting having a plurality of combustion chambers therein, comprising cooperating sections relatively movable toward each other and cooperating in their innermost position to form a permanent mold cavity corresponding in contour to the shape of the casting, means for separating said sections subsequent to the pouring operation, means engaging one outer face of the casting to clamp the opposite face into engagement with the adjacent mold section during separation of the sections, means for subsequently moving the latter section and means other than said retaining means operable upon the aforesaid movement of the latter section to eject the casting therefrom.

3. Molding apparatus for forming a cylinder head casting having a plurality of combustion chambers therein and having a series of apertured stud bosses, comprising a permanent mold section having portions upon one face thereof for forming a mold cavity corresponding in contour to the shape of the combustion chambers, a second section positioned adjacent the section aforesaid, means providing for relative movements of the sections toward and away from each other, a plurality of core pins fixed to the second section and operable upon relative movement of the sections toward each other to extend through the first section into the mold cavity for forming the stud bosses in the casting, and means for ejecting the casting from the first section including sleeves mounted upon said core pins for relative sliding movement and having the outer ends thereof abutting the portions of the casting surrounding the core pins.

4. Molding apparatus for forming a casting of predetermined contour, comprising a permanent mold section having portions on one face thereof for forming a mold cavity, a section positioned adjacent the section aforesaid and having a plurality of permanent core pins fixed thereto in predetermined spaced relationship, means for relatively moving the sections toward each other to extend the core pins into the mold cavity and for relatively moving the sections away from each other to withdraw the core pins from the casting, sleeves mounted upon the core pins for relative sliding movement having the outer ends abutting the casting and operable upon relative movement of the sections away from each other in timed relation to withdrawing the core pins from the casting to eject the latter from the first section.

5. Molding apparatus for forming a cylinder head casting having a plurality of combustion chambers therein and having a series of stud bosses, comprising a permanent mold section having portions on one face for forming a mold cavity corresponding in contour to the shape of the combustion chambers, a second section mounted adjacent the opposite face of the section aforesaid, a series of core pins corresponding in number and spacing to the stud bosses in the casting and fixed to the second section, means for relatively moving the sections toward each other to extend the core pins through the first section into the mold cavity, means operable subsequent to the molding operation for moving the second section in a direction away from the first section to withdraw the core pins from the casting, sleeves upon the core pins having the outer ends extending into the first section for abutting engagement with the portions of the casting surrounding the core pins, and means operable in timed relation to the withdrawal of the core pins for relatively moving the sleeves and first section to eject the casting from the latter section.

6. Permanent molding apparatus for forming a cylinder head casting having a plurality of combustion chambers therein and having a series of stud bosses, comprising permanent mold sections mounted for relative movement toward each other and having portions on adjacent surfaces thereof cooperating in the innermost positions of the same to form a permanent mold cavity, a member positioned adjacent the sections aforesaid and having a plurality of core pins corresponding in number and spacing to the stud bosses in the cylinder head casting, means for moving said member to extend the core pins as a unit through one of said sections into the mold cavity and for withdrawing the pins from the mold cavity upon completion of the molding operation, means operable in timed relation to the withdrawal of the core pins from the cavity to separate the sections, and means engageable with the side face of the casting contacting one mold section to clamp the opposite face of the casting to the other section upon separation of the sections.

7. Permanent molding apparatus for forming a cylinder head casting having a plurality of combustion chambers therein and having a series of stud bosses, comprising permanent mold sections mounted for relative movement toward each other and having portions on adjacent surfaces thereof cooperating in the innermost positions of the same to form a permanent mold cavity, a member positioned adjacent the sections aforesaid and having a plurality of core pins corresponding in number and spacing to the stud bosses in the cylinder head casting, means for moving said member to extend the core pins as a unit through one of said sections into the mold cavity and for withdrawing the pins from the mold cavity upon completion of the molding operation, means operable in timed relation to the withdrawal of the core pins from the cavity to separate the sections, means engageable with the side face of the casting contacting one mold section to clamp the opposite face of the casting to the other section upon separation of the sections, and means for subsequently ejecting the casting from the last named permanent mold section.

8. Molding apparatus for forming a casting having a predetermined contour comprising, a plurality of relatively movable permanent mold sections, one of said sections having mold forming portions on one face thereof cooperating with complementary mold forming portions on an adjacent face of another section in one relative position of the sections to form a mold cavity, a third section having a plurality of permanent core members thereon fashioned to extend into the mold cavity through aligned openings in one of the aforesaid sections when the sections are in the above mentioned relative positions thereof, means for automatically effecting relative movements of the sections from the foregoing relative positions thereof in accordance with a predetermined sequence to open the mold, and means engageable with one outer side face of the casting during relative movement of the sections to open the mold for clamping the opposite side face into engagement with the adjacent mold section.

9. Molding apparatus for forming an engine cylinder head having stud bolts openings therethrough, comprising a permanent mold section, a metallic core member secured to one face of the section, a second mold section cooperating with the permanent mold section and core member to form a cavity corresponding in contour to the cylinder head, core pins extending into the cavity through aligned openings in the permanent mold section and core member to form the stud bolt openings in the head, ejector sleeves upon the core pins having the inner ends normally arranged to form the surface of the head surrounding the stud bolt openings, and means for relatively moving the permanent mold section and sleeves to extend the inner ends of the latter into the mold cavity.

10. Molding apparatus for forming a casting having a predetermined contour, comprising a plurality of relatively movable permanent mold sections cooperating in one relative position to form a mold cavity corresponding in shape to the contour of the casting, means for relatively moving the sections from the aforesaid position thereof to open the mold, means extending through one section and engageable with the face of the casting contacting the latter section to clamp the opposite face of the casting to the adjacent mold section upon relative movement of the sections to open the mold, ejector means associated with the last named section of the permanent mold, and means for relatively moving the latter section and ejector means for ejecting the casting from this section.

RANDOLPH J. ROSHIRT.
ARTHUR T. BATEMAN.
ANDREW IRVINE.